United States Patent
Choi et al.

(10) Patent No.: US 12,176,540 B2
(45) Date of Patent: Dec. 24, 2024

(54) NEGATIVE ACTIVE MATERIAL AND RECHARGEABLE LITHIUM BATTERY INCLUDING SAME

(71) Applicant: SAMSUNG SDI CO., LTD., Yongin-si (KR)

(72) Inventors: Hee Seon Choi, Yongin-si (KR); Deok-Hyun Kim, Yongin-si (KR); Yurim Cha, Yongin-si (KR); Narae Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 18/386,322

(22) Filed: Nov. 2, 2023

(65) Prior Publication Data
US 2024/0379959 A1    Nov. 14, 2024

(30) Foreign Application Priority Data
May 10, 2023    (KR) .................... 10-2023-0060641

(51) Int. Cl.
*H01M 4/587*    (2010.01)
*H01M 4/36*    (2006.01)
*H01M 10/0525*    (2010.01)
*H01M 4/02*    (2006.01)

(52) U.S. Cl.
CPC ........... *H01M 4/587* (2013.01); *H01M 4/366* (2013.01); *H01M 10/0525* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 2016/0211512 A1* | 7/2016 | Sugiyama | H01M 10/0525 |
| 2017/0187041 A1* | 6/2017 | Yamada | H01M 10/0525 |
| 2020/0127289 A1* | 4/2020 | Kim | H01G 11/32 |
| 2021/0265630 A1* | 8/2021 | Choi | H01M 4/133 |
| 2021/0280855 A1 | 9/2021 | Lee et al. | |

FOREIGN PATENT DOCUMENTS

| | | | | |
|---|---|---|---|---|
| CN | 111463416 A | * | 7/2020 | ........ H01M 10/0525 |
| EP | 3770999 A1 | | 1/2021 | |
| JP | 2012-216532 A | | 11/2012 | |
| JP | 2013137875 A | * | 7/2013 | ............. Y02E 60/10 |
| JP | 2015064936 A | * | 4/2015 | ............. H01G 11/06 |
| KR | 10-2020-0074552 A | | 6/2020 | |

OTHER PUBLICATIONS

European Search Report dated Oct. 21, 2024.

* cited by examiner

*Primary Examiner* — Wyatt P McConnell
(74) *Attorney, Agent, or Firm* — Lee IP Law, P.C.

(57) ABSTRACT

A negative active material for a rechargeable lithium battery and a rechargeable lithium battery that includes the negative active material. The negative active material includes a first active material, which includes tertiary particles of natural graphite in which secondary particles are agglomerated. Primary particles are agglomerated and spheroidized in the secondary particles. Artificial graphite is positioned on a surface of the primary particles and a surface of the secondary particles. An amorphous carbon coating layer surrounds the tertiary particles of natural graphite. Further, the negative active material includes a second active material, which includes a carbon-based material having an aspect ratio of about 2 to about 100.

16 Claims, 7 Drawing Sheets

7

NEGATIVE ACTIVE MATERIAL AND RECHARGEABLE LITHIUM BATTERY INCLUDING SAME

CROSS-REFERENCE TO RELATED APPLICATION

Korean Patent Application No. 10-2023-0060641 filed on May 10, 2023, in the Korean Intellectual Property Office and entitled: "NEGATIVE ACTIVE MATERIAL AND RECHARGEABLE LITHIUM BATTERY INCLUDING THE SAME," is incorporated herein in its entirety by reference.

BACKGROUND

1. Field

Embodiments of this disclosure are directed to a negative active material and a rechargeable lithium battery including the negative active material.

2. Description of the Related Art

Recently, the rapid development of electronic devices such as mobile phones, laptop computers, and electric vehicles using batteries has resulted in surprising increases in demand for rechargeable batteries with relatively high capacity and lighter weight. For example, a rechargeable lithium battery has recently drawn attention as a driving power source for portable devices, as it has light weight and high energy density. Accordingly, research for improving the performance of rechargeable lithium is actively being conducted.

SUMMARY

Embodiments are directed to a negative active material exhibiting improved high power characteristics.

Some embodiments are directed to a rechargeable lithium battery including the negative active material.

Embodiments may be realized by providing a negative active material including a first active material, which includes tertiary particles of natural graphite in which secondary particles are agglomerated. Primary particles are agglomerated and spheroidized in the secondary particles. Artificial graphite positioned on a surface of the primary particles and a surface of the secondary particles. An amorphous carbon coating layer surrounds the tertiary particles of natural graphite. The negative active material further includes a second active material, which includes a carbon-based material having an aspect ratio of about 2 to about 100.

Embodiments may be realized by providing a rechargeable lithium battery including a negative electrode including the negative active material, a positive electrode, and an electrolyte.

In some embodiments, the aspect ratio of the second active material may be about 2 to about 50.

In some embodiments, the amount of the second active material may be about 10 percent by weight (wt %) to about 30 wt % based on the total 100 wt % of the negative active material.

In some embodiments, the second active material may include artificial graphite.

In some embodiments, the second active material may have an average length of a long axis of about 40 μm to about 120 μm.

In some embodiments, in the negative active material, an area ratio of the second active material may be about 10% to about 40% based on the total area 100% of the negative active material.

In some embodiments, the natural graphite may be a flake natural graphite.

In some embodiments, the negative active material has an orientation index of about 40 to about 70.

In some embodiments, the negative active material may have a mercury cumulative pore volume of about 1.5 mL/g to about 3 mL/g.

In some embodiments, the second active material may have a rod shape.

In some embodiments, in the first active material, the amount of the amorphous carbon may be about 0.01 wt % to about 5 wt % based on the total 100 wt % of the first active material.

In some embodiments, in the first active material, the amount of the artificial graphite may be about 9 wt % to about 16.5 wt % of the total 100 wt % of the first active material.

In some embodiments, in the first active material, the amount of the natural graphite may be about 78.5 wt % to about 89 wt % based on the total 100 wt % of the first active material.

In some embodiments, the first active material may have a tapped density of about 0.8 g/cc to about 1.1 g/cc.

In some embodiments, the amorphous carbon may include at least one of soft carbon, hard carbon, mesophase pitch carbide, sintered coke, baked coke, or a mixture thereof.

A negative active material according to some embodiments may exhibit excellent cycle life characteristics and reduced volume expansion characteristics.

BRIEF DESCRIPTION OF THE DRAWINGS

Features will become apparent to those of skill in the art by describing in detail exemplary embodiments with reference to the attached drawings, in which.

DETAILED DESCRIPTION

Figure 1:
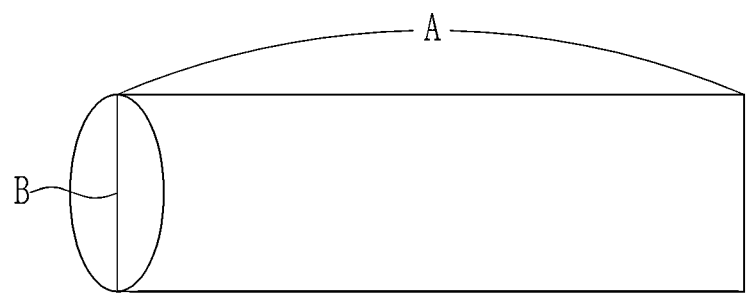
FIG. 1 is a schematic diagram illustrating the structure of the second active material according to some embodiments.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that if a layer or element is referred to as being "on" another layer or substrate, it can be directly on the other layer or substrate, or intervening layers may also be present. In addition, it will also be understood that if a layer is referred to as being "between" two layers, it can be the only layer between the two layers, or one or more intervening layers may also be present. Like reference numerals refer to like elements throughout.

In the present disclosure, if a definition is not otherwise provided, expressions in the singular include expressions in plural unless the context clearly dictates otherwise. Unless otherwise defined, "A or B" may indicate "include A or B, or include both A and B.

In the present disclosure, unless otherwise defined in the specification, a particle diameter may be an average particle diameter. The particle diameter indicates an average particle diameter or size (D50) where a cumulative volume is about 50 volume % in a particle size distribution. The average particle size (D50) may be measured by a method well known to those skilled in the art, for example, by a particle size analyzer, or by a transmission electron microscopic image, or a scanning electron microscopic image. Alternatively, a dynamic light-scattering measurement device is used to perform a data analysis, and the number of particles is counted for each particle size range, and from this, the average particle diameter (D50) value may be easily obtained through a calculation.

A negative active material according to some embodiments includes a first active material 1 and a second active material.

The first active material 1 may include, e.g., tertiary particles 7 of natural graphite, in which secondary particles 5 are agglomerated. The secondary particles 5 may be prepared by agglomerating and spheroidizing primary particles 3. Artificial graphite 9 may be positioned on a surface of the primary particles 3 and a surface of the secondary particles 5. An amorphous carbon coating layer 11 may surround the tertiary particles 7 of natural graphite.

The second active material may be a carbon-based material with an aspect ratio of about 2 to about 100.

As such, in some embodiments, the negative active material may include the first active material 1 agglomerated by natural graphite and artificial graphite and may have a substantially spherical shape. The second active material may have an aspect ratio of about 2 to about 100 and an elongated shape.

Embodiments using the negative active material may exhibit and enjoy rapid charging and long cycle life characteristics by virtue of including the first active material 1, while also exhibiting and benefitting from decreases in volume expansion during charging and discharging, a reduction in resistance, and improvements in high rate capability, by including the second active material.

The amount of the second active material may be about 10 percent by weight (wt %) to about 30 wt %, or about 20 wt % to about 30 wt % based on the total 100 wt % of the negative active material. If the amount of the second active material in the negative active material is within this range, increased positive effects and results may be obtained by virtue of having included the second active material.

The second active material may be an artificial graphite. If the artificial graphite is included as the second active material, it may further improve the charge and discharge efficiency and the cycle life characteristics as compared to natural graphite.

In one embodiment, the second active material is a rod-type crystalline carbon. The rod-type refers to a shape that is longer in one direction. As shown in FIG. 1, it represents a stick shape with a long axis (A) and a short axis (B). The rod-type refers to the stick shape that is substantially filled inside and is different from a hollow or fiber shape that has a long axis and a short axis but is empty inside.

The rod-type has an aspect ratio which is a ratio of a length of the long axis/a length of the short axis of more than 1. The second active material according to some embodiments may be a carbon-based material with an aspect ratio of about 2 to about 100, about 2 to about 50, about 2 to about 20, about 2 to about 15, or about 5 to about 10. If the aspect ratio of the second active material is within the range, resistance and volume expansion of the negative electrode 20 during charge and discharge may be further reduced and high-rate characteristics may be further improved.

The average length of the long diameter of the second active material may be about 40 μm to about 120 μm, or about 50 μm to about 120 μm. If the long diameter of the second active material is within the range, resistance and volume expansion of the negative electrode 20 during charge and discharge may be further reduced and the high-rate characteristics may be further improved.

The long diameter refers to the average length of the long axis, and for example, it indicates a size of the long axis (A) of the rod (stick) carbon shown in FIG. 1.

In the negative active material according to some embodiments, an area ratio of the second active material may be about 10% to about 40%, or about 20% to about 30% based on 100% of the total area of the negative active material. The area ratio may be measured by using a particle analyzer and indicates a ratio of area which the second active material occupies per unit area of the negative active material.

Figure 2A:
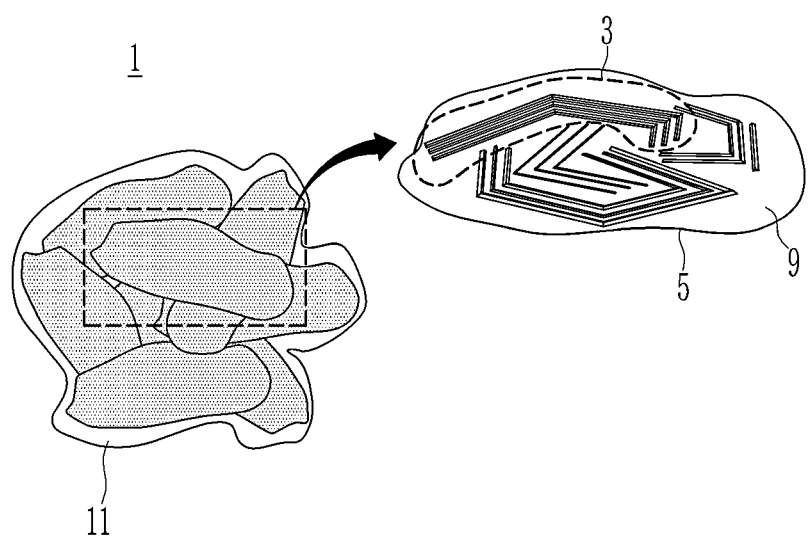
FIG. 2A illustrates the structure of the first active material according to some embodiments.

A structure of the first active material 1 according to some embodiments is shown in FIG. 2A. The right portion of FIG. 2A shows an enlarged view of secondary particles 5 corresponding to a dotted line. The first active material 1 according to some embodiments includes secondary particles 5, in which a plurality of primary particles 3 are agglomerated and spheroidized, and tertiary particles 7 of natural graphite, in which the secondary particles 5 are agglomerated. An amorphous carbon coating layer 11 surrounding the tertiary particles 7 of natural graphite is included. Artificial graphite 9 is positioned on a surface of the primary particles 3 and a surface of the secondary particles 5.

Figure 2B:
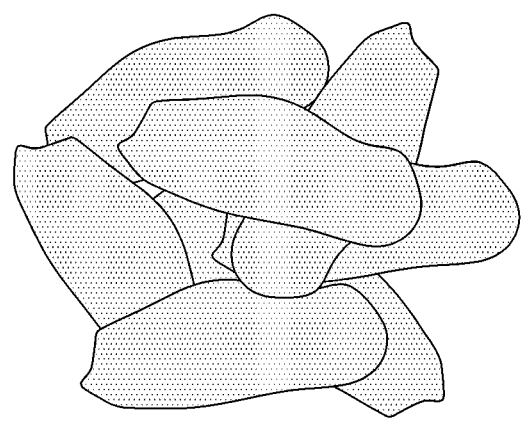
FIG. 2B illustrates the tertiary particles of natural graphite illustrating the structure of the first active material shown in FIG. 2A.

FIG. 2B more clearly shows the tertiary particles 7 of natural graphite in FIG. 2A.

Crystalline carbon, particularly natural graphite, used as the negative active material, has a higher capacity than artificial graphite, so it may accomplish an ideal capacity close to the theoretical capacity. However, natural graphite includes large-sized particles having a particle diameter of about 40 μm to about 120 μm, so it is subjected to a spheroidizing process for use as the negative active material. Such a negative active material includes limited sites at which intercalation and deintercalation may occur, and thus, unsuitable charge and discharge characteristics, for example unsuitable high-rate charge and discharge characteristics, may be exhibited.

The first active material 1 according to some embodiments includes secondary particles 5, in which primary particles 3 of pulverized natural graphite are agglomerated and spheroidized, tertiary particles 7, in which the secondary particles 5 are agglomerated, and artificial graphite 9, which is positioned on a surface of the primary particles 3 and a surface of the secondary particles 5. Therefore, sites at which lithium ions are intercalated and deintercalated may be increased, and thus, the movement of lithium ions may be facilitated. As such, the negative active material according to some embodiments may exhibit improved rapid charge and discharge characteristics.

In some embodiments, the natural graphite may be flake natural graphite which may facilitate the lithium intercalation. According to another embodiment, the flake natural graphite may be small-sized flake natural graphite. If the natural graphite is small-sized flake natural graphite, sites where the lithium ions may be intercalated and deintercalated are increased in the same area, and a passage through which the lithium ions may be transferred becomes shorter, making it more suitable for a rapid charge and discharge.

The first active material 1 according to some embodiments is prepared by spheroidizing and bending the small-sized primary particles 3, and thus, lithium may intercalate into the negative active material, for example, not only into both ends of the flake natural graphite, but also into the bent portion. As such, the negative active material according to some embodiments includes the increased lithium intercalation sites. Thus, improved chargeability, especially high-rate chargeability, may be exhibited.

The primary particles 3 may have a particle diameter of about 4 μm to about 8 μm. The particle diameter of the primary particles 3 may be, for example, about 5 μm to about 8 μm, about 6 μm to about 8 μm, or about 6 μm to about 7 μm.

The secondary particles 5 may have a particle diameter of about 5 μm to about 10 μm. The particle diameter of the secondary particles 5 may be, for example, about 6 μm to about 10 μm, about 6 μm to about 8 μm, or about 7 μm to about 8 μm, The tertiary particles 7 may have a particle diameter of about 9 μm to about 15 μm. For example, it may be about 9.2 μm to about 15 μm, or about 9.5 μm to about 15 μm.

If the particle diameters of the primary particles 3 are within the range of about 4 μm to about 8 μm, the primary particles 3 may be easily prepared, the cycle life characteristics may be further improved, and the primary particles 3 may be readily usable in a rechargeable lithium battery 100. If the particle diameters of the secondary particles 5 are about 5 μm to about 10 μm, the secondary particles 5 may readily form the tertiary particles 7 and may be readily usable in the rechargeable lithium battery 100. If the particle diameters of the tertiary particles 7 are about 9 μm to about 15 μm, excellent initial efficiency may be exhibited and excellent charge and discharge characteristics of the negative electrode 20 may be exhibited, which may be readily applied to the rechargeable lithium battery 100.

In the negative active material according to some embodiments, a thickness of the amorphous carbon coating layer 11 may be about 5 nm to about 50 nm, for example, about 10 nm to about 50 nm, or about 20 nm to about 50 nm. The amorphous carbon coating layer 11 with the thickness within the range may more effectively suppress the side reaction with the electrolyte and may improve the charge and discharge rate capability.

The first active material 1 including the primary particles 3, the secondary particles 5 and the tertiary particles 7 having particle diameters within the specified ranges and the amorphous carbon coating layer 11 with a thickness within the specified range may have a particle diameter of about 9.05 μm to about 16 μm. The particle diameter of the first active material 1 may be, for example, about 9.05 μm to about 16 μm, about 9.2 μm to about 15.5 μm, or about 9.5 μm to about 15 μm. If the particle diameter of the first active material 1 is within the range, the volume expansion of the negative electrode 20 during charge and discharge may be more effectively suppressed and the high-rate characteristics may be further improved.

In some embodiments, the secondary particles 5 are formed by agglomerating a plurality of primary particles 3. The secondary particles 5 may be formed by gathering, for example, about 2 to about 30, about 2 to about 20, about 2 to about 10, or about 2 to about 4 primary particles 3. In some embodiments, the tertiary particles 7 are formed by agglomerating the secondary particles 5. The tertiary particles 7 may be formed by gathering, for example, about 2 to about 20, about 2 to about 10, or about 2 to about 4 secondary particles 5.

In some embodiments, the amount of the artificial graphite 9 may be about 9 wt % to about 16.5 wt %, about 9 wt % to about 15 wt %, or about 10 wt % to about 14.5 wt % based on the total 100 wt % of the negative active material. In some embodiments, because the artificial graphite 9 is positioned on the surface of the primary particles 3 and the surface of the secondary particles 5, the artificial graphite 9 of the amount within the above range may increase the density of the inside of the negative active material. As the first active material 1 according to some embodiments includes the secondary particles 5, in which primary particles 3 are agglomerated and spheroidized, and the tertiary particles 7, in which the secondary particles 5 are agglomerated, artificial graphite 9 filled into spaces that may be formed between the particles, for example, artificial graphite 9 in an amount within the above-specified range, may more sufficiently pack the spaces. This enables the inside of the negative active material to be dense.

In some embodiments, the amount of natural graphite may be about 78.5 wt % to about 89 wt %, about 80 wt % to about 88.5 wt %, or about 80.5 wt % to about 88 wt % based on the total 100 wt % of the first active material 1.

The first active material 1 according to one embodiment may have an orientation index (O.I.) of about 40 to about 90, about 45 to about 90, or about 50 to about 90. The first active material 1 may have an orientation index within the specified range, which indicates that it is random oriented similarly to artificial graphite. Thus, the first active material 1 according to some embodiments may exhibit excellent charge rate capability similar to that of artificial graphite.

In one or more embodiments, the orientation index may be obtained from an X-ray diffraction analysis using a CuKα ray and, for example, may be obtained as a ratio ($I_{002}/I_{110}$) of a peak intensity at a (002) plane relative to a peak intensity at a (110) plane.

The negative active material of some embodiments may have a mercury cumulative pore volume (Hg Cumulative Pore Volume) of about 1.5 mL/g to about 3 mL/g, about 2 mL/g to about 3 mL/g, or about 2 mL/g to about 2.8 mL/g. The mercury cumulative pore volume within the range indicates that the pores, for example, empty spaces inside of the negative active material, are small. The pores measured in the pore volume may have a particle diameter of about 0.01 μm to about 1 μm.

If the mercury cumulative pore volume is within the specified range, the electrolyte may be sufficiently impregnated to facilitate the charge and discharge reaction, while the side reaction between the active material and the electrolyte may not increase.

In some embodiments, the mercury cumulative pore volume may be obtained by adding mercury to the negative active material, applying a pressure of about 0.1 psi to about 60,000 psi to inject mercury into the active material, and measuring a change in volume of mercury according to a change in pressure. The change in pressure may be obtained by adjusting the pressure from about 0.1 psi to about 0.2 psi to about 50,000 psi to 60,000 psi.

As such, the first active material 1 according to some embodiments may have advantages of high capacity, good compression properties and excellent pellet density from use of natural graphite, improved high-rate charge capability from the increased lithium intercalation sites provided by including secondary particles 5 in which the small-sized primary particles 3 are agglomerated, and high charge capability of artificial graphite 9. The effects for improving the charge and discharge rate characteristics by including the amorphous carbon coating layer 11 may also be obtained.

The amorphous carbon may be at least one of soft carbon, hard carbon, mesophase pitch carbide, sintered coke, baked coke, or mixtures thereof. In some embodiments, the amount of the amorphous carbon may be about 0.01 wt % to about 5 wt % based on the total 100 wt % of the first active material 1.

The first active material 1 may have a tapped density of about 0.8 g/cc to about 1.1 g/cc, for example, about 0.9 g/cc to about 1.1 g/cc. If the first active material 1 has the tapped density within the specified range, the internal pore volume of the first active material 1 and the side reaction with an electrolyte may be decreased, so as to improve cycle life characteristics of a battery.

The first active material 1 may be prepared by the following procedure.

Natural graphite raw material having a particle diameter of about 80 μm or more may be reduced in size by pulverization into primary particles 3. The natural graphite raw materials may be pulverized into the primary particles 3 by an airstream grinding method. The airstream grinding may be performed by grinding the natural graphite with airstream under conditions of about 5 kg/cm$^2$ to about 20 kg/cm$^2$ at a room temperature.

The natural graphite raw material may be a flake natural graphite.

The pulverization and reduction in size may be performed in order to have a particle diameter of primary particles 3 of about 4 μm to about 8 μm, for example, about 4 μm to about 7 μm, about 4 μm to about 6 μm, or about 5 μm to about 7 μm.

The primary particles 3 are subjected to spheroidization and agglomeration using spheroidizing equipment to prepare secondary particles 5. The spheroidization and agglomeration may be performed in order to have a particle diameter of the secondary particle 5 of about 5 μm to about 10 μm, for example, about 6 μm to about 10 μm, about 6 μm to about 8 μm, or about 7 μm to about 8 μm.

The secondary particles 5 are mixed with the first amorphous carbon precursor to prepare a mixed product. By this process, the inside of the secondary particles 5 may be densified.

A second amorphous carbon precursor is added to the resulting mixed product to agglomerate tertiary particles 7. The agglomeration may be performed by using general agglomeration equipment.

The first and the second amorphous carbon precursor may be one selected from a phenolic resin, a furan resin, an epoxy resin, polyacrylonitrile, a polyamide resin, a polyimide resin, a polyamide imide resin, synthetic pitch, petroleum-based pitch, coal-based pitch, tar, and a combination thereof.

The first and the second amorphous carbon precursor may convert to crystalline carbon, for example, artificial graphite 9, during the subsequent heat-treatment, and thus, the mixing ratio of the secondary particles 5 and the first and the second amorphous carbon precursor may be adjusted in order to have about 9 wt % to about 16.5 wt % of artificial graphite 9 based on the total 100 wt % of the negative active material in the final product.

The process may include inserting the first and the second amorphous carbon precursors inside of the secondary particles 5, resulting in positioning the amorphous carbon precursors on the surfaces of the primary particles 3 and also the surfaces of the secondary particles 5.

The resulting tertiary particles 7 are primarily heat-treated. The primary heat treatment may be carried out at a suitable high temperature in order to graphitize the first and the second amorphous carbon precursors, for example, about 2,800° C. to about 3,000° C. The primary heat treatment may be performed for about 1 hour to about 5 hours, for example, about 1 hour to about 4 hours, or about 1 hour to about 3 hours. According to the process, the first and the second amorphous carbon precursors may be converted into artificial graphite 9. The first and the second amorphous carbon precursors positioned on the surfaces of the primary particles 3 and the surfaces of the secondary particles 5 are converted into artificial graphite 9. Therefore, artificial graphite 9 may be positioned on these surfaces.

The resulting primary heat treatment product is coated with a third amorphous carbon precursor. The third amorphous carbon precursor may be one selected from one of a phenolic resin, a furan resin, an epoxy resin, polyacrylonitrile, a polyamide resin, a polyimide resin, a polyamide imide resin, synthetic pitch, petroleum-based pitch, coal-based pitch, tar, and a combination thereof. The third amorphous carbon precursor may be the same as or different from the first and/or the second amorphous carbon precursors.

In the coating, the amount of the third amorphous carbon precursor may be appropriately adjusted such that the thickness of the amorphous carbon coating layer 11 is about 5 nm to about 60 nm in the final product, the first active material 1.

The coated product is secondarily heat-treated. The secondary heat-treatment may be carried out at about 800° C. to about 2,000° C., for example, about 800° C. to about 1,800° C., about 800° C. to about 1,600° C., about 800° C. to about 1,400° C., or about 1,200° C. to about 1,300° C. The secondary heat-treatment may be carried out for about 1 hour to about 5 hours, about 1 hour to about 4 hours, or about 1 hour to about 3 hours.

Some embodiments provide a negative electrode 20, a positive electrode 10, and a non-aqueous-based electrolyte.

The negative electrode 20 includes a negative active material layer including the negative active material according to one embodiment, a binder, and optionally, a conductive material, and a current collector supporting the negative active material layer.

In the negative active material layer, the amount of the negative active material may be about 95 wt % to about 99 wt % based on the total 100 wt % of the negative active material layer.

The amount of the binder may be about 1 wt % to about 5 wt % based on the total 100 wt % of the negative active material layer.

If the conductive material is further included, the amount of the negative active material may be about 90 wt % to about 98 wt % based on the total 100 wt % of the negative active material layer and amounts of the binder and the conductive material may be about 1 wt % to about 5 wt %, respectively, based on the total 100 wt % of the negative active material layer.

The binder improves binding properties of negative active material particles with one another and with a current collector. The binder may be a non-aqueous binder, an aqueous binder, or a combination thereof.

The non-aqueous binder may be an ethylene propylene copolymer, polyacrylonitrile, polystyrene, polyvinylchloride, carboxylated polyvinylchloride, polyvinyl fluoride, polyurethane, polytetrafluoroethylene, polyvinylidene fluoride, polyethylene, polypropylene, polyamide imide, polyimide, or combinations thereof.

The aqueous binder may be a styrene-butadiene rubber (SBR), an acrylated styrene-butadiene rubber (ABR), an acrylonitrile-butadiene rubber, an acrylic rubber, a butyl rubber, a fluorine rubber, an ethylene oxide-containing polymer, polyvinyl pyrrolidone, polypropylene, polyepichlorohydrin, polyphosphazene, an ethylene propylene diene copolymer, polyvinyl pyridine, chlorosulfonated polyethylene, latex, a polyester resin, an acrylic resin, a phenolic resin, an epoxy resin, polyvinyl alcohol, or combinations thereof.

The negative binder may also include a cellulose-based compound. The cellulose-based compound includes one or more of carboxymethyl cellulose, hydroxypropylmethyl cellulose, methyl cellulose, or alkali metal salts thereof. The alkali metal may be Na, K, or Li. The cellulose-based compound may serve as a thickener which may provide viscosity and may also serve as a binder. The amount of the cellulose-based compound may be, for example, about 0.1 parts by weight to about 3 parts by weight based on 100 parts by weight of the negative active material.

The conductive material is included to provide electrode conductivity, and any electrically conductive material may be used as a conductive material unless it causes a chemical change. Examples of the conductive material may be a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof.

The positive electrode may include a current collector and a positive active material layer formed on the current collector.

The positive electrode active material may include lithiated intercalation compounds that reversibly intercalate and deintercalate lithium ions. In some embodiments, one or more composite oxides of a metal selected from cobalt, manganese, nickel, and a combination thereof, and lithium, may be used. For example, the compounds represented by one of the following chemical formulae may be used. $Li_aA_{1-b}X_bD^1_2$ (0.90≤a≤1.8, 0≤b≤0.5); $Li_aA_{1-b}X_bO_{2-c1}D^1_{c1}$ (0.90≤a≤1.8, 0≤b≤0.5, 0≤c1≤0.05); $Li_aE_{1-b}X_bO_{2c-1}D^1_{c1}$ (0.90≤a≤1.8, 0≤b≤0.5, 0≤c1≤0.05); $Li_aE_{2-b}X_bO_{4-c1}D^1_{c1}$ (0.90≤a≤1.8, 0≤b≤0.5, 0≤c1≤0.05); $Li_aNi_{1-b-c}Co_bX_cD^1_\alpha$ (0.90≤a≤1.8, 0≤b≤0.5, 0≤c≤0.5, 0<α<2); $Li_aNi_{1-b-c}Co_bX_cO_{2-\alpha}T_\alpha$ (0.90≤a≤1.8, 0≤b<0.5, 0≤c≤0.5, 0<α<2); $Li_aNi_{1-b-c}Co_bX_cO_{2-\alpha}T_2$ (0.90≤a≤1.8, 0≤b≤0.5, 0≤c≤0.5, 0<α<2); $Li_aNi_{1-b-c}Mn_bX_cD^1_\alpha$ (0.90≤a≤1.8, 0≤b≤0.5, 0≤c≤0.5, 0<α<2); $Li_aNi_{1-b-c}Mn_bX_cO_{2-\alpha}T_\alpha$ (0.90≤a≤1.8, 0≤b≤0.5, 0≤c≤0.5, 0<α<2); $Li_aNi_{1-b-c}Mn_bX_cO_{2-\alpha}T_2$ (0.90≤a≤1.8, 0≤b≤0.5, 0≤c≤0.5, 0<α<2); $Li_aNi_bE_cG_dO_2$ (0.90≤a≤1.8, 0≤b≤0.9, 0≤c≤0.5, 0.001≤d≤0.1); $Li_aNi_bCo_cL^1_dG_eO_2$ (0.90≤a≤1.8, 0≤b≤0.9, 0≤c≤0.5, 0≤d≤0.5, 0≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); $Li_aFePO_4$ (0.90≤a≤1.8)

In the above chemical formulae, A is selected from Ni, Co, Mn, or a combination thereof; X is selected from Al, Ni, Co, Mn, Cr, Fe, Mg, Sr, V, a rare earth element, or a combination thereof; $D^1$ is selected from O, F, S, P, or a combination thereof; E is selected from Co, Mn, or a combination thereof; T is selected from F, S, P, or a combination thereof; G is selected from Al, Cr, Mn, Fe, Mg, La, Ce, Sr, V, or a combination thereof; Q is selected from Ti, Mo, Mn, or a combination thereof; Z is selected from Cr, V, Fe, Sc, Y, or a combination thereof; J is selected from V, Cr, Mn, Co, Ni, Cu, or a combination thereof; and $L^1$ is selected from Mn, Al, or a combination thereof.

The compounds may have a coating layer on the surface or may be mixed with another compound having a coating layer. The coating layer may include at least one coating element compound selected from the group consisting of an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be applied in a method having no adverse influence on properties of a positive electrode active material by using these elements in the compound, and for example, the method may include any coating method such as spray coating, dipping, and the like, but is not illustrated in more detail since it is well-known in the related field.

In the positive electrode, the amount of the positive active material may be about 90 wt % to about 98 wt % based on the total weight of the positive active material layer.

In some embodiments, the positive active material layer may further include a binder and a conductive material. The binder and the conductive material may be included in an amount of about 1 wt % to about 5 wt %, respectively based on the total amount of the positive active material layer.

The binder improves binding properties of positive active material particles with one another and with a current collector. Examples of the binder may be polyvinyl alcohol, carboxymethyl cellulose, hydroxypropyl cellulose, diacetyl cellulose, polyvinylchloride, carboxylated polyvinylchloride, polyvinyl fluoride, an ethylene oxide-containing polymer, polyvinyl pyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like.

The conductive material is included to provide electrode conductivity, and any electrically conductive material may be used as a conductive material unless it causes a chemical change. Examples of the conductive material may include a carbon-based material such as natural graphite, artificial graphite, carbon black, acetylene black, ketjen black, a carbon fiber and the like; a metal-based material of a metal powder or a metal fiber including copper, nickel, aluminum, silver, and the like; a conductive polymer such as a polyphenylene derivative; or a mixture thereof.

The current collector may include Al.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. The ester-based solvent may include methyl acetate, ethyl acetate, n-propyl acetate, dimethyl acetate, methyl propionate, ethyl propionate, decanolide, mevalonolactone, caprolactone, or the like. The ether-based solvent may include dibutyl ether, tetraglyme, diglyme, dimethoxyethane, 2-methyltetrahydrofuran, tetrahydrofuran, or the like. The ketone-based solvent may include cyclohexanone, or the like. The alcohol-based solvent may include ethyl alcohol, isopropyl alcohol, and the like, and examples of the aprotic solvent include nitriles such as R—CN (where R is a C2 to C20 linear, branched, or cyclic hydrocarbon, and may include a double bond, an aromatic ring, or an ether bond), amides such as dimethylformamide, dioxolanes such as 1,3-dioxolane, sulfolanes, and the like.

The organic solvent may be used alone or in a mixture. If the organic solvent is used in a mixture, the mixture ratio may be controlled in accordance with a desirable battery performance, and it may be well known to those skilled in the related art.

The carbonate-based solvent may include a mixture with a cyclic carbonate and a linear carbonate. The cyclic carbonate and linear carbonate are mixed together in a volume ratio of about 1:1 to about 1:9, and if the mixture is used as an electrolyte, it may have enhanced performance.

The organic solvent may further include an aromatic hydrocarbon-based solvent as well as the carbonate-based solvent. The carbonate-based solvent and aromatic hydrocarbon-based solvent may be mixed together in a volume ratio of about 1:1 to about 30:1.

The aromatic hydrocarbon-based organic solvent may be an aromatic hydrocarbon-based compound represented by Chemical Formula 1.

[Chemical Formula 1]

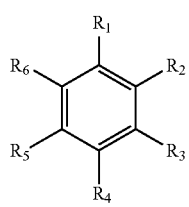

In Chemical Formula 1, $R_1$ to $R_6$ are the same or different and are selected from hydrogen, a halogen, a C1 to C10 alkyl group, a haloalkyl group, and a combination thereof.

The examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, or a combination thereof.

The electrolyte may further include vinylethyl carbonate, vinylene carbonate, or an ethylene carbonate-based compound represented by Chemical Formula 2 as an additive for improving cycle life.

[Chemical Formula 2]

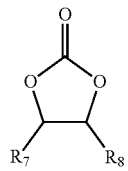

In Chemical Formula 2, $R_7$ and $R_8$ are the same or different and may each be independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not simultaneously hydrogen.

Examples of the ethylene carbonate-based compound may be difluoro ethylene carbonate, chloroethylene carbonate, dichloroethylene carbonate, bromoethylene carbonate, dibromoethylene carbonate, nitroethylene carbonate, cyanoethylene carbonate, fluoroethylene carbonate, or the like. The amount of the additive for improving the cycle life characteristics may be used within an appropriate range.

The lithium salt dissolved in an organic solvent supplies a battery with lithium ions, basically operates the rechargeable lithium battery 100, and improves transportation of the lithium ions between a positive electrode 10 and a negative electrode 20. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LIN(SO_3C_2F_5)_2$, $Li(FSO_2)_2N$ (lithium bis(fluorosulfonyl)imide: LiFSI), $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2)$, wherein x and y are natural numbers, for example, an integer of about 1 to about 20, lithium difluoro(bisoxolato) phosphate), LiCl, LiI, $LiB(C_2O_4)_2$ (lithium bis(oxalato) borate: LiBOB) and lithium difluoro(oxalato)borate (LiDFOB). The concentration of the lithium salt may range from about 0.1 M to about 2.0 M. If the lithium salt is included at the above concentration range, an electrolyte may have excellent performance and lithium ion mobility due to optimal electrolyte conductivity and viscosity.

A separator may 30 be located between the positive electrode 10 and the negative electrode 20 depending on a type of a rechargeable lithium battery 100. The separator 30 may use polyethylene, polypropylene, polyvinylidene fluoride or multi-layers thereof having two or more layers and may be a mixed multilayer such as a polyethylene/polypropylene double-layered separator, a polyethylene/polypropylene/polyethylene triple-layered separator, a polypropylene/polyethylene/polypropylene triple-layered separator, and the like.

Figure 3:
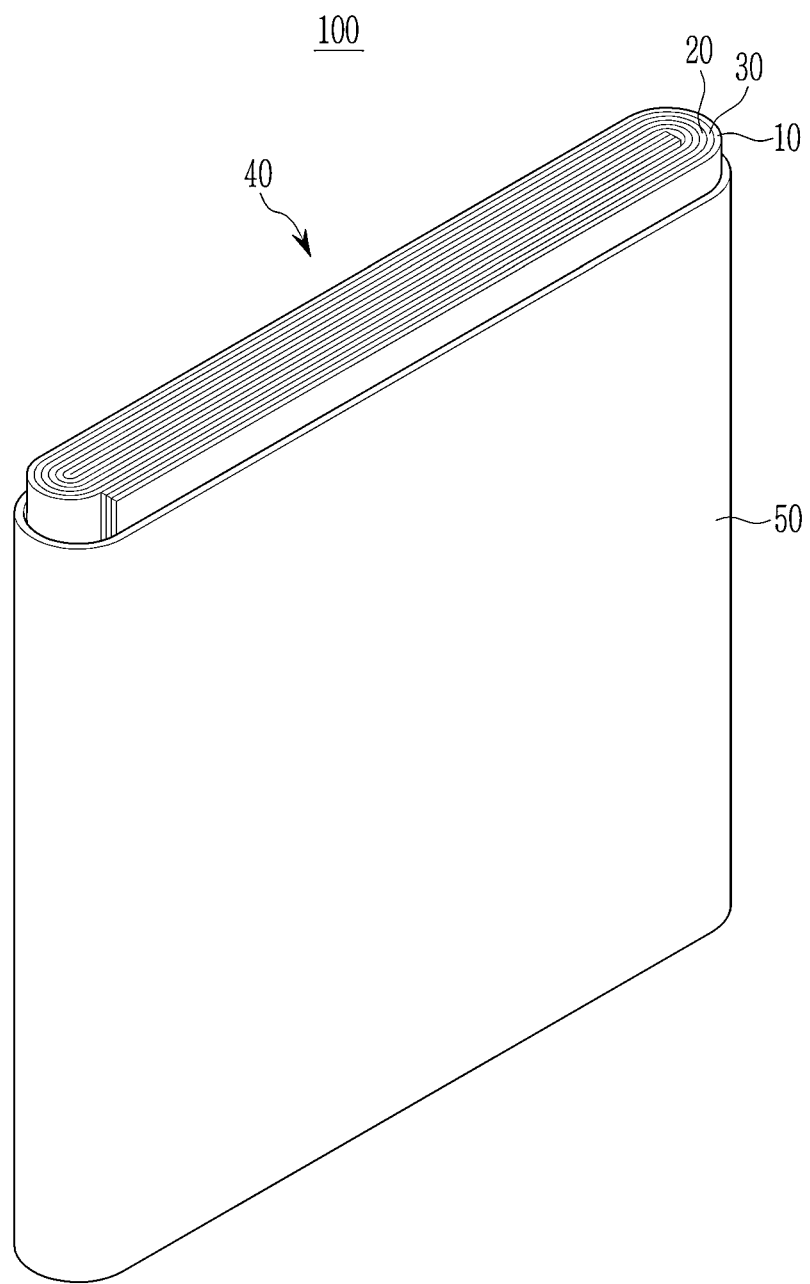
FIG. 3 is a schematic, perspective view illustrating a rechargeable lithium battery according to some embodiments.

FIG. 3 is an exploded perspective view of a rechargeable lithium battery 100 according to some embodiments. The rechargeable lithium battery 100 according to some embodiments is illustrated as a prismatic battery but may include variously shaped batteries such as a cylindrical battery, a pouch battery, and the like.

Referring to FIG. 3, a rechargeable lithium battery 100 according to an embodiment may include an electrode assembly 40 manufactured by winding a separator 30 located between a positive electrode 10 and a negative electrode 20 and a case 50 housing the electrode assembly 40. An electrolyte (not shown) may be impregnated in the positive electrode 10, the negative electrode 20 and the separator 30.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

A flake natural graphite raw material having a particle diameter of 80 μm to 120 μm was airstream ground to prepare small-sized primary particles having an average particle diameter D50 of 4.9. The small-sized primary particles were spheroidized and agglomerated by using a spheroidizing equipment to prepare secondary particles having an average particle diameter D50 of 6.1 μm. The secondary particles were mixed with a first pitch carbon to prepare a mixed product.

Thereafter, a second petroleum-based pitch carbon was added to the mixed product and agglomerated to prepare tertiary particles having an average particle diameter D50 of 10.4 μm.

The prepared tertiary particles were primarily heat treated at 2,800° C. for 2 hours. During the heat treatment, the first and the second pitch carbons were graphitized and existed as artificial graphite on the surfaces of the primary particles and the secondary particles.

The resulting heat-treated product was coated with a third petroleum-based pitch and secondarily heat-treated at 1,200° C. for 2 hours to prepare a first active material having an average particle diameter D50 of 10.5 μm and a tapped density of 1.04 g/cc. The prepared first active material included secondary particles in which primary particles were agglomerated and spheroidized, and tertiary particles of natural graphite in which the secondary particles were agglomerated, artificial graphite positioned on the surface of the primary particles and the surface of the secondary particles, and a soft carbon coating layer surrounding the surface of the tertiary particles.

During preparation, the used amounts of the tertiary particles, the first pitch carbon, the second pitch carbon, and the third pitch carbon were adjusted in order to have an amount of natural graphite of 87 wt %, an amount of artificial graphite of 10 wt % and an amount of the soft carbon coating layer of 3 wt % in the prepared first active material based on the total 100 wt % of the negative active material.

A rod-type artificial graphite having a long diameter (length of a long axis) of 60 μm and a maximum aspect ratio of 10 was used as a second active material.

The first active material was mixed with the second active material at a weight ratio of 90:10 to prepare a negative active material.

97.5 wt % of the negative active material (a mixing ratio of the first active material: the second active material was a weight ratio of 90:10), 1.5 wt % of styrene-butadiene rubber binder, and 1.0 wt % of a carboxymethyl cellulose thickener, were mixed in a water solvent to prepare a negative active material slurry.

The negative active material slurry was coated on a Cu foil current collector, dried and pressurized under a general procedure to prepare a negative electrode including the current collector and a negative active material layer formed on the current collector.

Using the negative electrode, a lithium metal counter electrode, and an electrolyte, a coin-type half-cell was fabricated. The electrolyte was 1.5M LiPF$_6$ dissolved in a mixed solvent of ethylene carbonate and ethylmethyl carbonate and dimethyl carbonate (20:10:70 volume ratio).

Example 2

A negative electrode and a half-cell were fabricated by the same procedure as in Example 1, except that the mixing ratio of the first active material and the second active material was changed to a weight ratio of 80:20 to prepare a negative active material.

Example 3

A negative electrode and a half-cell were fabricated by the same procedure as in Example 1, except that the mixing ratio of the first active material and the second active material was changed to a weight ratio of 85:15 to prepare a negative active material.

Comparative Example 1

A spherical natural graphite having a particle diameter of 10 μm to 15 μm was used as a negative active material.

Using the negative active material, a negative electrode and a half-cell were fabricated by the same procedure as in Example 1.

Comparative Example 2

The negative active material of Comparative Example 1 was used as a first active material and a rod-type artificial graphite having a long diameter (length of a long axis) of 60 μm and a maximum aspect ratio of 10 was used as a second active material, and then the first active material was mixed with the second active material at a weight ratio of 90:10 to prepare a negative active material.

Using the negative active material, a negative electrode and a half-cell were fabricated by the same procedure as in Example 1.

Experimental Example 1) Measurement of SEM

Figure 4:
FIG. 4 is a SEM (scanning electron microscope) image of negative active material according to Example 1.
Figure 5:
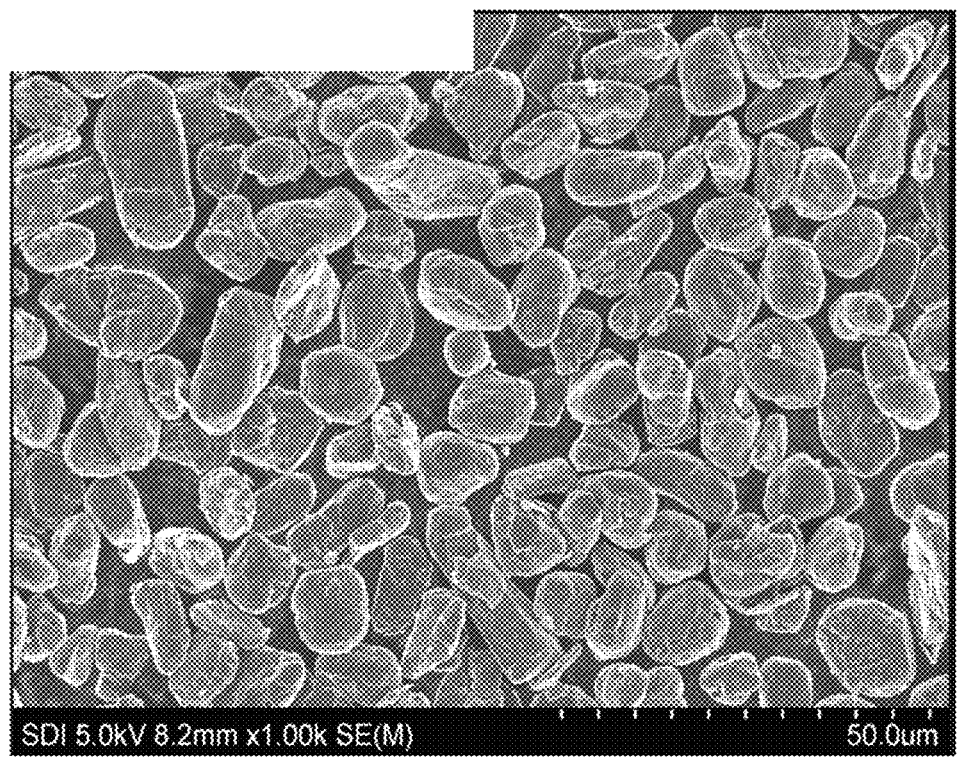
FIG. 5 is a SEM image of negative active material according to Comparative Example 1.
Figure 6:
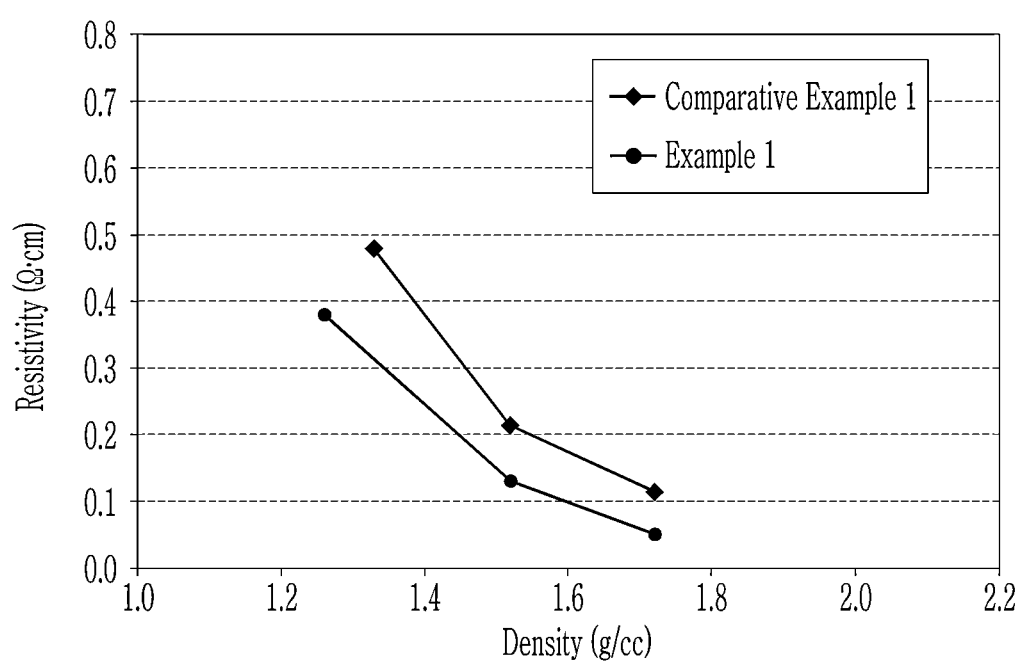
FIG. 6 is a graph illustrating resistance across varied densities of the active mass according to Example 1 and Comparative Example 1.

The SEM images of the negative active materials of Example 1 and Comparative Example 1 are shown in FIG. 4 and FIG. 5, respectively. As shown in FIG. 4, the rod-type second active material and the agglomerated spherical first active material are distributed in the negative active material of Example 1. In contrast, as shown in FIG. 5, the negative active material of Comparative Example 1, which was natural graphite, had a spherical shape.

Experimental Example 2) Evaluation of Area Ratio

The area ratio occupied by the second active material in the negative active material according to Examples 1 to 3 and Comparative Example 2 was measured by a particle analyzer. The results are shown in Table 1.

Experimental Example 3) Evaluation of Orientation Index

The orientation index of the negative active materials according to Examples 1 to 3 and Comparative Examples 1 and 2 was measured by an X-ray diffraction analysis using a CuKα ray, as a ratio ($I_{002}/I_{110}$) of the peak intensity at a (002) plane relative to the peak intensity at a (110) plane. The results are shown in Table 1, as O.I.

Experimental Example 4) Evaluation of Mercury Cumulative Pore Volume

The mercury cumulative pore volume of the negative electrodes according to Examples 1 to 3 and Comparative Examples 1 to 3 was determined by adding mercury to the negative active material, applying a pressure of 0.1 psi to inject mercury into the negative active material, and then increasing the pressure to 60,000 psi to measure a volume change of mercury. The results are shown in Table 1. The measured pores had a particle diameter of 0.01 μm to 1 μm.

Experimental Example 5) Evaluation of Charge Capability

The half-cells according to Examples 1 to 3 and Comparative Examples 1 to 2 were charged and discharged at 0.2 C once and charged and discharged at 2 C once.

A ratio of the charge capacity at 2 C relative to the charge capacity at 0.2 C was calculated. The results are shown in Table 1, as a charge rate capability.

Experimental Example 6) Evaluation of Direct Current Internal Resistance (DC-IR)

The half cells according to Examples 1 to 3 and Comparative Examples 1 to 2 were charged and discharged once under a condition of constant current/constant voltage charging under a condition of 0.2 C, 4.25 V, 0.05 C cut-off at 25° C., pausing for 10 minutes, constant current discharging under a condition of 0.33 C, 2.80 V cut-off, and pausing for 10 minutes. DC internal resistance (DC-IR) was evaluated by measuring a voltage drop (V) while a current flowed at 1 C for 1 second under a SOC50 (50% charge capacity based on 100% of entire battery charged capacity, which is 50% discharged in a discharged state). The resistance values were obtained from the measured voltage and the applied current (1 C). The results are shown as a direct current internal resistance (DC-IR). The results are shown in Table 1.

Experimental Example 7) Evaluation of Swelling Characteristic

The half-cells according to Examples 1 to 3 and Comparative Examples 1 to 2 were charged and discharged at 3 C for 19 cycles for 6000 minutes. The thicknesses before charging and discharging and after charging and discharging were respectively measured. An increase ratio of thickness was calculated by the following Equation 1. The results are shown in Table 1, as an expansion ratio.

$$\text{Increase ratio of thickness}(\%) = [(\text{cell thickness after charging and discharging} - \text{cell thickness before charging and discharging charge and discharge}) / (\text{cell thickness before charging and discharging charge and discharge})] * 100 \quad [\text{Equation 1}]$$

TABLE 1

| | Area ratio (%) | O.I. | Mercury pore volume (mL/g) | Charge-ability (%) | DC-IR (Ω) | Expansion ratio (%) |
|---|---|---|---|---|---|---|
| Example 1 | 15 | 78.4 | 2.01 | 47 | 6.3 | 6.6 |
| Example 2 | 20 | 80.8 | 2.24 | 51 | 6.0 | 5.9 |
| Example 3 | 30 | 85.7 | 2.71 | 48 | 6.1 | 6.1 |
| Comparative Example 1 | — | 66.6 | 1.8 | 42 | 6.6 | 8.2 |
| Comparative Example 2 | 15 | 74.1 | 2.43 | 44 | 6.5 | 7.1 |

As shown in Table 1, Examples 1 to 3 using the agglomerated first active material and the second active material having the maximum aspect ratio of 10 to 100 exhibited excellent chargeability, low DC-IR of 6.0Ω to 6.3Ω, and low expansion ratio. Examples 1 to 3 had the mercury pore volume of the total negative active material with the first active material and the second active material within 2.01 mL/g to 2.71 mL/g, so that it can be expected that the electrolyte is readily impregnated.

On the other hand, Comparative Example 2 using a mixture of the spherical natural graphite and the second active material with the maximum aspect ratio of 10 exhibited similar chargeability, DC-IR, and expansion ratio to Comparative Example 1, which used only spherical natural graphite, and thus, it can be seen that the improvement effect is insignificant.

From these results, the effects by using the carbon-based active material having an aspect ratio of 2 to 100 may be maximized if the agglomerated first active material is used with it.

Example embodiments have been disclosed herein, and although specific terms are employed, they are used and are to be interpreted in a generic and descriptive sense only and not for the purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A negative active material, comprising:
a first active material, comprising:
tertiary particles of natural graphite in which secondary particles are agglomerated;
primary particles are agglomerated and spheroidized in the secondary particles;
artificial graphite positioned on a surface of the primary particles and a surface of the secondary particles; and
an amorphous carbon coating layer surrounding the tertiary particles of natural graphite; and
a second active material, comprising a carbon-based material having an aspect ratio of about 2 to about 100.

2. The negative active material as claimed in claim 1, wherein the aspect ratio of the second active material is about 2 to about 50.

3. The negative active material as claimed in claim 1, wherein an amount of the second active material is about 10 percent by weight (wt %) to about 30 wt % based on the total 100 wt % of the negative active material.

4. The negative active material as claimed in claim 1, wherein the second active material comprises artificial graphite.

5. The negative active material as claimed in claim 1, wherein the second active material has an average length of a long axis of about 40 μm to about 120 μm.

6. The negative active material as claimed in claim 1, wherein in the negative active material, an area ratio of the second active material is about 10% to about 40% based on the total area 100% of the negative active material.

7. The negative active material as claimed in claim 1, wherein the natural graphite is a flake natural graphite.

8. The negative active material as claimed in claim 1, wherein the negative active material has an orientation index of about 40 to about 70.

9. The negative active material as claimed in claim 1, wherein the negative active material has a mercury cumulative pore volume of about 1.5 mL/g to about 3 mL/g.

10. The negative active material as claimed in claim 1, wherein the second active material has a rod shape.

11. The negative active material as claimed in claim 1, wherein in the first active material, an amount of the amorphous carbon is about 0.01 wt % to about 5 wt % based on the total 100 wt % of the first active material.

12. The negative active material as claimed in claim 1, wherein in the first active material, an amount of the artificial graphite is about 9 wt % to about 16.5 wt % of the total 100 wt % of the first active material.

13. The negative active material as claimed in claim 1, wherein in the first active material, an amount of the natural graphite is about 78.5 wt % to about 89 wt % based on the total 100 wt % of the first active material.

14. The negative active material as claimed in claim 1, wherein the first active material has a tapped density of about 0.8 g/cc to about 1.1 g/cc.

15. The negative active material as claimed in claim 1, wherein the amorphous carbon comprises at least one of soft carbon, hard carbon, mesophase pitch carbide, sintered coke, and or a mixture thereof.

16. A rechargeable lithium battery, comprising:
a negative electrode comprising the negative active material as claimed in claim 1;
a positive electrode; and
an electrolyte.

* * * * *